United States Patent [19]

Block

[11] 4,197,752

[45] Apr. 15, 1980

[54] THERMAL GAS PRESSURE GAUGE METHOD AND APPARATUS

[76] Inventor: Barry Block, 30610 Page Mill Rd., Los Altos, Calif. 94022

[21] Appl. No.: 963,103

[22] Filed: Nov. 22, 1978

[51] Int. Cl.$^2$ .......................................... G01L 21/12
[52] U.S. Cl. ................................................... 73/755
[58] Field of Search .................. 73/755, 723, 729, 702

[56] References Cited
U.S. PATENT DOCUMENTS 3,199,356  8/1965  Andriulis ............................... 73/755

FOREIGN PATENT DOCUMENTS 1022056 12/1952 France ........................................ 73/755
434289   6/1974 U.S.S.R. ..................................... 73/755

Primary Examiner—Donald O. Woodiel
Attorney, Agent, or Firm—Harry E. Aine; Harvey G. Lowhurst

[57] ABSTRACT

In the thermal gas pressure gauge, a foil heater has a heater surface disposed in gas communication with the gas to be measured and the heater surface is thermally cycled at first and second reference frequencies to produce cyclical heating of the gaseous material adjacent the heating element. A directional microphone is disposed facing the heating element to derive signals of an amplitude determined by the amplitude of the cyclical heating effect of the gaseous material at the first and second reference frequencies. The detected signals are synchronously detected to produce a pair of dc outputs indicative of pressure in two respective pressure regimes. In an overlap pressure regime the two dc outputs are converted to digital signals which are correlated with pairs of values tabled in a read only memory for reading out a digital signal indicative of the pressure. In a low pressure regime from approximately $10^{-4}$ torr and below to the region of 1 to 10 torr, the measured pressure is independent of the molecular gas species and therefore is an absolute gauge, whereas in the higher pressure regime from 1 to 10 torr to the condensation pressure of the measured gas, the measured pressure is somewhat dependent on the molecular gas species. For measurement in the higher pressure regime, the heater and microphone are contained within a volume of the gas separated from the relatively large volume of a chamber being measured by means of an acoustic filter. The acoustic filter provides a high impedance to pressure waves at the second or higher reference frequency to avoid dissipation of the generated pressure wave to be measured within the large chamber volume. The tabled values in the read only memory permit a smooth transition of the gauge measurement from the first to the second regime.

16 Claims, 9 Drawing Figures

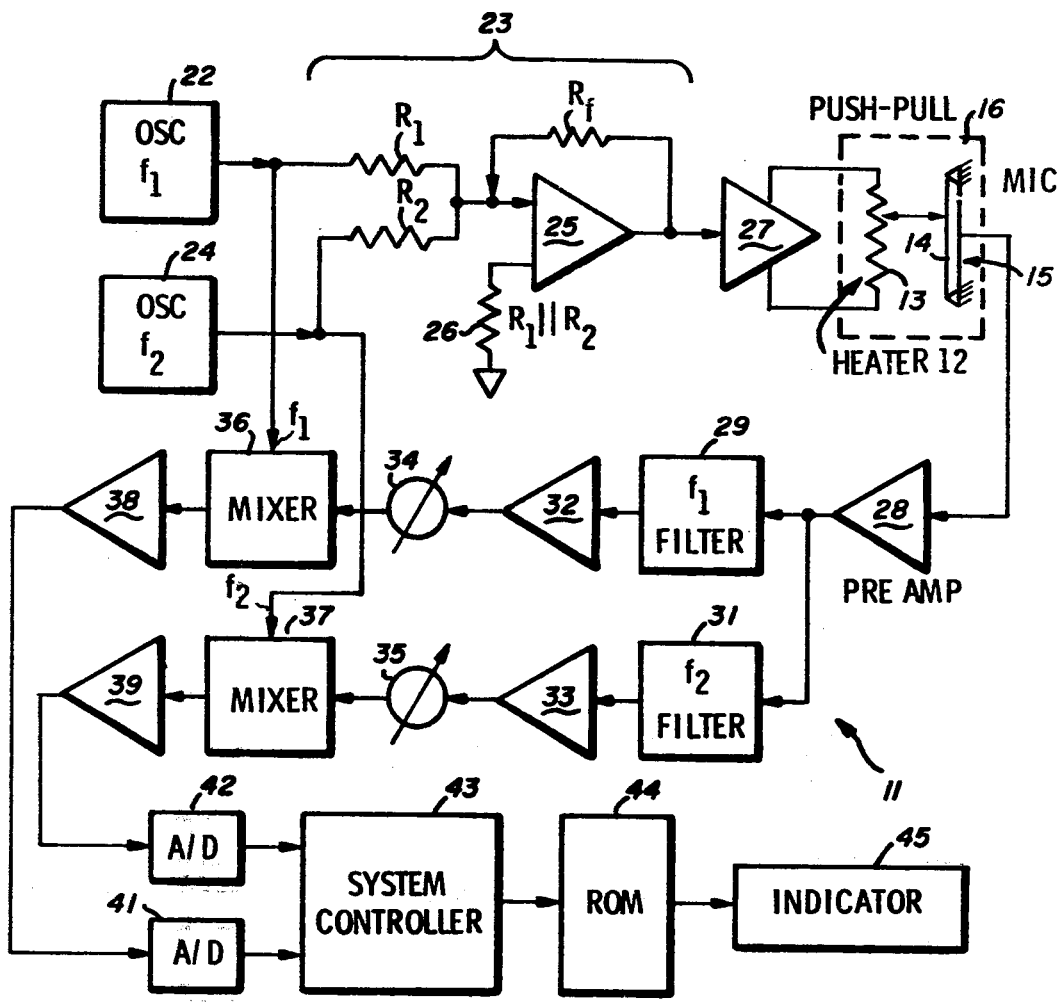
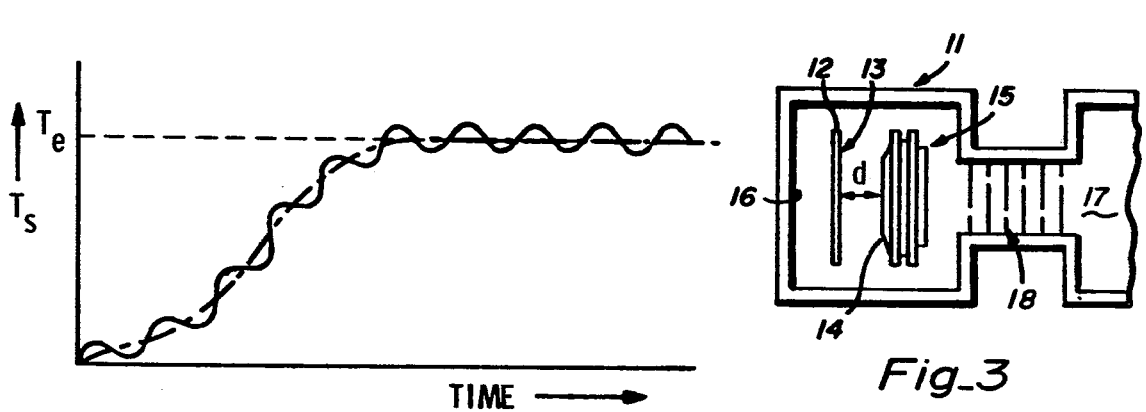
Fig.1
Fig.2
Fig.3

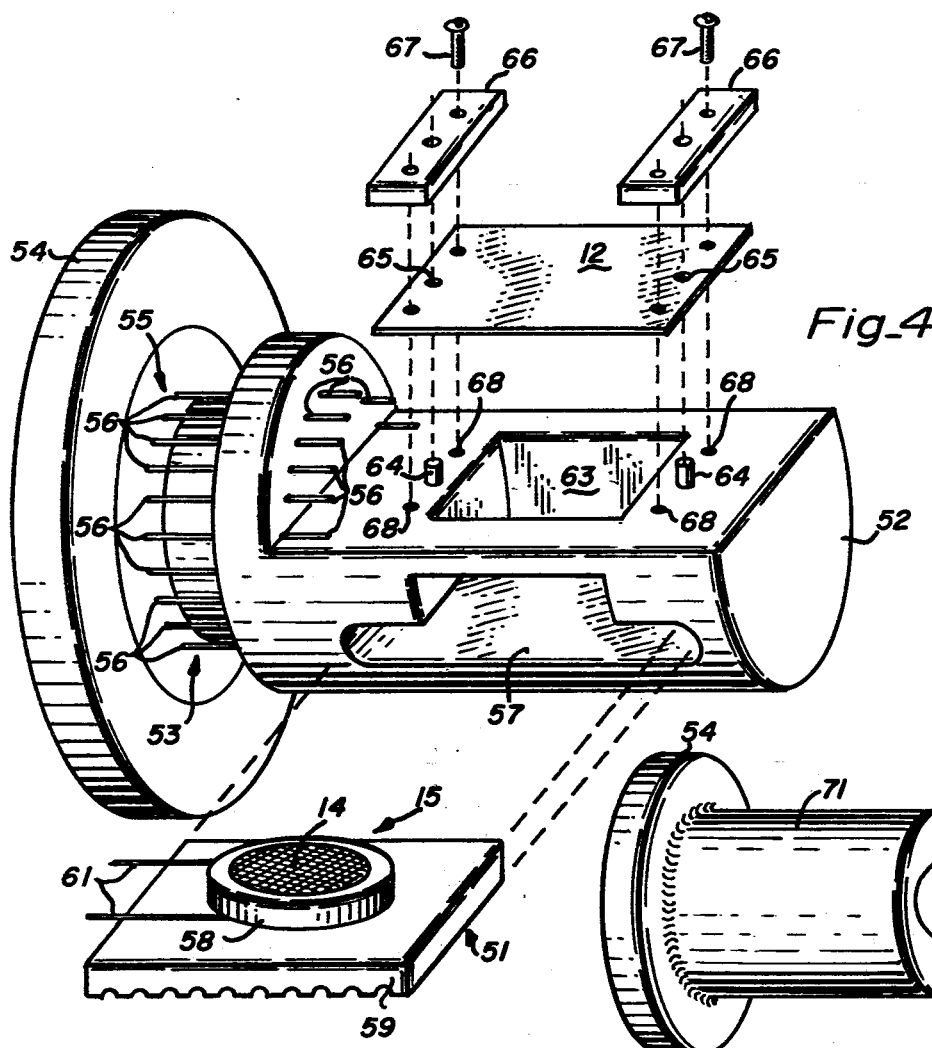
Fig_4
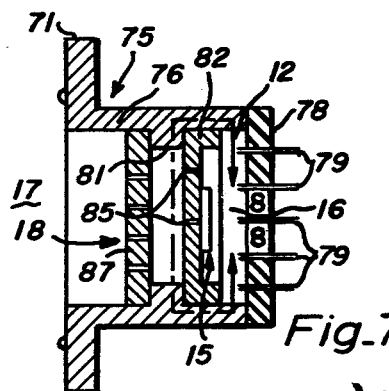
Fig_5
Fig_6
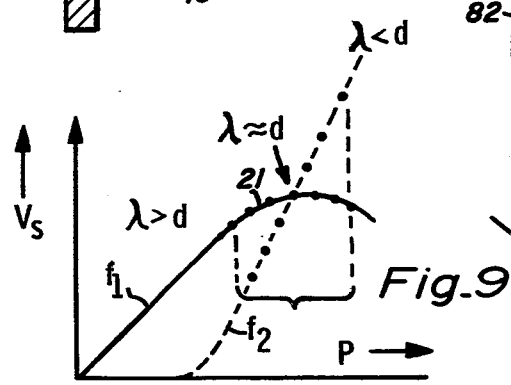
Fig_7
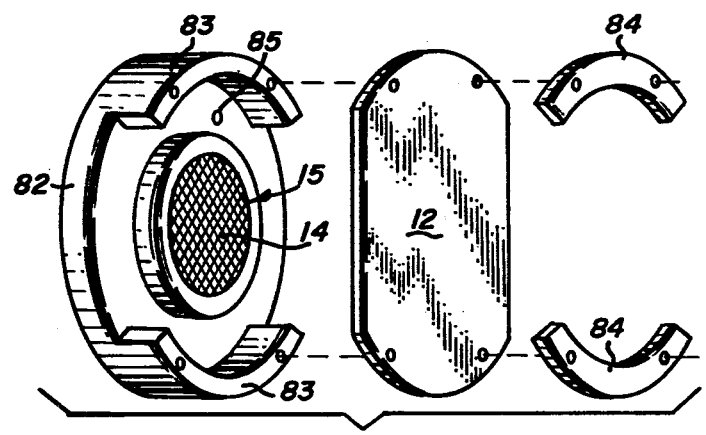
Fig_8
Fig_9

THERMAL GAS PRESSURE GAUGE METHOD AND APPARATUS

BACKGROUND OF THE INVENTION

The present invention relates in general to method and apparatus for measuring gas pressure and, more particularly, to gas pressure measuring method and apparatus employing a thermal effect.

DESCRIPTION OF THE PRIOR ART

Heretofore, thermal gas pressure gauges have employed a relatively large area surface heater energized with dc current. A detector vane was closely spaced facing the heater such that, in a low pressure regime where the mean free path is large compared to the space between the detector vane and the heater, the molecules of gas pick up the elevated temperature of the heater surface, thereby increasing their momentum and they transfer that momentum to the adjacent vane by bombardment thereof. The detector vane is supported on a spring such that the vane position is displaced as a function of the net momentum transfer to the vane. The displacement of the vane is detected by a light beam to give an output indicative of the pressure. This type of gauge is known as a Knudsen gauge and is operable in the pressure regime where the spacing between the vane and the heating surface is small compared to the mean free path of the molecules within the gauge and is operable to relatively low pressures on the order of $10^{-6}$ torr. Such a gauge is described in the second edition of Scientific Foundations of Vacuum Technique, by Dushmann and Lafferty published by John Wiley & Sons in 1962, see pages 260-280.

The problem with a Knudsen type gauge is that, due to the nonlinearity of the spring support for the vane, acoustic noises and other vibrations in the system are coupled into the vane displacement and result in producing interferring displacement signals which are extremely difficult to eliminate in use. Elimination of these effects requires a substantial amount of integration and thus the time to take a given measurement, particularly at low pressures, is a direct function of the amount of noise in the system and in modern day vacuum systems employing mechanical vacuum pumps and the like, the vibrational environment is so severe that the time required to take a measurement is relatively long, i.e., on the order of several minutes, when accuracy of 1% is desired in the pressure regime of $10^{-6}$ torr.

Another problem with the Knudsen type gauge is that it does not provide a measure of the pressure when the mean free path of the molecules is small compared to the spacing between the heater and the vane.

Thus, it is desired to provide an improved gas pressure gauge which will provide accurate measurement of pressure with relatively short measuring time and which is operable in the pressure range from $10^{-4}$ torr and below up to atmospheric pressure and above.

SUMMARY OF THE PRESENT INVENTION

The principal object of the present invention is the provision of an improved thermal gas pressure gauging method and apparatus.

In one feature of the present invention, the temperature of the heating surface exposed to the gas pressure to be measured is thermally cycled to produce a cyclical heating effect which is sensed to derive an output indicative of the gas pressure.

In another feature of the present invention, the sensor for sensing the cyclical heating effect comprises a microphone facing the cyclically heated surface.

In another feature of the present invention, the sensor for sensing the cyclical heating effect includes a microphone having a diaphragm disposed facing the heating surface such that the microphone is directionally sensitive to heating effects generated on the thermally cycled heating surface.

In another feature of the present invention, the cyclical heating effect is synchronously detected in synchronism with a frequency related to the frequency of the heating effect, whereby the signal to noise of the measurement is substantially improved.

In another feature of the present invention, a low pass acoustic filter serves to separate the measurement region containing the sensor from the remainder of the gas chamber and the frequency of the temperature cycling of the heating surface is related to the high frequency cut off of the acoustic filter so as to provide a high impedance to acoustic wave energy at the signal frequency, thereby permitting a substantial pressure wave to be generated for sensing.

In another feature of the present invention, a very wide range pressure gauge is provided wherein the heating element is cycled at two different frequencies, a low frequency component being utilized for the low pressure regime wherein the mean free path is large compared to the distance between the heating surface and microphone, whereas a higher frequency component is employed for generating a pressure wave that is sensed in the range where the mean free path is small compared to the distance between the sensor and heating surface.

In another feature of the present invention, the cyclical heating effect is sensed at two frequencies to derive two outputs which are correlated with pairs of tabled values in a memory to derive a measurement of pressure particularly useful in the transition region wherein the distance between the heating surface and the sensor is approximately equal to the mean free path in the gas.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a thermal gas pressure gauge incorporating features of the present invention, FIG. 2 is a plot of heater surface temperature vs time depicting the cyclical variations in the heating of the heater surface, FIG. 3 is a schemtic diagram of a thermal gas pressure gauge incorporating features of the present invention, FIG. 4 is an exploded perspective view of one embodiment of a pressure gauge incorporating features of the present invention, FIG. 5 is a reduced perspective view of the gauge of FIG. 4 with a separator installed for separating the volume of the gauge from the volume of the system under measurement, FIG. 6 is an enlarged detail view of a portion of the structure of FIG. 5 delineated by line 6—6.

FIG. 7 is a longitudinal cross sectional view of an alternative thermal pressure gauge incorporating features of the present invention, FIG. 8 is an enlarged perspective exploded view of a portion of the structure of FIG. 7 delineated by line 8—8 and, FIG. 9 is a plot of signal voltage vs pressure for the composite wide pressure range version of the thermal pressure gauge of the present invention.

DESCRIPTION OF THE PREFERRED EMBODIMENTS

Referring now to FIGS. 1-3 there is shown the thermal gas pressure gauge 11 of the present invention. In FIG. 3, the sensor and the basic structural elements of the gauge 11 are shown in greater detail. The gauge 11 includes a foil heater 12, such as a 10,000 angstroms thick foil of titanium, having a major face 13 with an area of 1 to 2 square centimeters which faces a planar diaphragm portion 14 of a microphone 15. The heater surface 13 is spaced from the diaphragm 14 by a predetermined distance d. The heater 12 and microphone or sensor 15, in a wide range or high pressure range device, are enclosed in a relatively small volume chamber 16 which is coupled to a main chamber 17 containing the gas to be measured via the intermediary of low pass acoustic filter 18.

The heater surface 13 is heated cyclically by means of a time varying current in the manner as indicated in FIG. 2 where the surface temperature $T_s$, upon passage of the sinusoidal current therethrough, reaches some equilibrium temperature $T_e$, about which the cyclical variations are produced by the driving ac current. In a preferred embodiment the heater current contains two sinusoidal frequency components $f_1$ and $f_2$. The acoustic filter 18 is formed and arranged so that $f_1$ is in the low pass region and $f_2$ is near the high frequency cut off of the low pass filter 18 so that the impedance to acoustic wave energy of the filter 18 at $f_2$ is substantial so that the pressure waves, if any, generated within the gauge chamber 16 are contained therein and not dissipated into the entire enclosure under measurement such as a very large chamber 17.

The pressure gauge 11 has two operating pressure regimes, i.e., low pressure and higher pressure regimes. In the low pressure regime, the mean free path $\lambda$ of the gas molecules within the chamber 17 under measurement is greater than the distance d between the heater surface 13 and the microphone diaphragm 14. This regime is shown in the diagram of FIG. 9. In the higher pressure regime of the gauge 11, the mean free path $\lambda$ of the molecules is smaller than the distance d between the heater surface 13 and the diaphragm portion 14. This regime is also depicted in FIG. 9.

In the low pressure regime, i.e., $\lambda$ greater than d, the gauge 11 operates in the manner of a modified Knudsen gauge wherein molecules coming in contact with the heated surface 13 pick up momentum therefrom which is a function of the instantaneous temperature of the heater surface 13 and that momentum is then transferred across the gap d to the microphone diaphragm 14 producing a time varying deflection thereof and a resultant ac signal at the respective modulation frequency. This modulation signal is synchronously detected, as more fully described below relative to FIG. 1, to produce an output indicative of the pressure. In the low pressure regime, as more fully described below, the gauge is an absolute gauge in that the output measurement is independent of the particular gas species, the pressure of which is being measured. In addition the gauge is an instantaneous gauge in as much as measurements are made with times falling within the band pass frequency range of the low pass filter. As the mean free path $\lambda$ approaches the spacing d between the heating surface 13 and the microphone 15, the output signal $V_s$ of the microphone, at the modulation frequency, begins to fall off as indicated by a curve 21 of FIG. 9. The pressure at which the output signal begins to fall off can be adjusted by properly selecting the distance between the heating element 13 and the diaphragm 14, to within certain limits.

In the high pressure regime, i.e., $\lambda$ smaller than d, the modulation frequency of the heater current is selected at a frequency $f_2$ which is higher than $f_1$ and which is near or above the high frequency cut off of the acoustic filter 18 so that the pressure wave generated within the measurement chamber 16 is confined therein rather than being dissipated within the entire and quite likely larger chamber 17 under measurement. In this regime, molecules coming in contact with the cyclically heated surface 13 produce a heated film of gas called a thermal wave. This is formed on the heater surface 13. This film has a thickness with a scale factor dependent on the thermal properties of the gas and a frequency dependence of $f^{-\frac{1}{2}}$. The thermal wave acts as a piston pressing on the gas in the enclosure 16 at the frequency $f_2$ and causing a pressure change which is sensed by the microphone 15. The low pass acoustic filter 18 keeps the signal pressure change at frequency $f_2$ from escaping while allowing passage for gas pressure changes which occur at characteristic times whose frequencies are below the low pass filter cut off frequency.

The pressure transition region corresponding to $\lambda=d$ can be made to yield a smooth positive monotonic output signal as a function of pressure by choosing the proper heater to microphone geometric factors and enclosure volume.

Referring now to FIG. 1 the thermal gas pressure gauge system 11 is depicted. A square wave oscillator 22 having a frequency $f_1$, as of 80 hertz, provides an output to one input of an adder circuit 23 for adding the frequency component $f_1$ to a second frequency component produced by a second square wave oscillator 24, at frequency $f_2$, which is substantially higher than frequency $f_1$, as of 410 hertz. The output of the second square wave oscillator 24, at $f_2$, is added to the output of the first oscillator 22 in adder 23 via adding resistors $R_1$ and $R_2$ feeding into a common node at one input to a linear amplifier 25 having a feed back resistor $R_f$. The other input to the linear amplifier 25 comprises a resistor 26 to ground having a value equal to the parallel resistance of resistors $R_1$ and $R_2$. The output of the adder 23 and power amplifier 27 is a push pull output connected directly across the heater foil 12 for directly heating the foil 12. The resultant gas heating effect signals at $f_1$ and $f_2$ are picked up in the microphone 15 and fed to the input of preamplifier 28 for amplification and thence are fed to the input of two band pass filters 29 and 31. Filter 29 has a band pass tuned for $f_1$ and filter 31 has a band pass tuned for frequency $f_2$. The filters preferably have a Q of 10 or more.

The outputs of the filters 29 and 31 are fed to amplifiers 32 and 33, respectively, for amplification therein and thence fed via phase shifters 34 and 35 to the input of respective mixers 36 and 37 for mixing with the square wave outputs at $f_1$ and $f_2$, respectively, fed to the other input terminals of the mixers 36 and 37.

The mixers 36 and 37 serve to synchronously detect the respective frequency components $f_1$ and $f_2$ derived from the microphone which are thence fed via d.c. pass filters and d.c. amplifiers 38 and 39 to respective A to D converters 41 and 42 for producing digital signals corresponding to the amplitudes of the respective AC signal components detected by the microphone 15 at frequencies $f_1$ and $f_2$, respectively. The outputs of the A to D converters are fed to a system controller 43 which compares the respective amplitudes with pairs of amplitudes stored in a read only memory 44 to derive an output corresponding to the tabled values as correlated with the measured pair of values. The output corresponding to the tabled values is then read out of the memory 44 to a digital display indicator 45 for digitally displaying the pressure to the operator. By reference to FIG. 9 it can be seen that in the pressure regime close to the region where the mean free path length $\lambda$ is approximately equal to the spacing d between the heating surface 13 and the microphone diaphragm 14, the two signals at $f_1$ and $f_2$ have pairs of values for a given pressure. In the regime of pressure below this transition point, the signal amplitude at $f_2$ is less than the signal amplitude at $f_1$, whereas above the transition point, the signal amplitude at $f_2$ is greater than the signal amplitude at $f_1$. For any given pressure and geometric configuration of the gauge, there are a pair of signal values $V_s$ corresponding to the given pressure. These values are tabled in the read only memory 44 for that given pressure and the system controller 43 reduces the two digital signals to two addresses in the read only memory 44. The two addresses in the read only memory specify a number to be displayed. This number is displayed in pressure in torr by the indicator 45. The digital system resolution is controlled by the number of addresses available to the read only memory 44 and may be increased by using a larger memory. In this system no interpolation is necessary. The general technique used in reducing two digital data signals to the two addresses for correlation with the pair of values stored in the read only memory is called "hashing" and is well known in the art. The system controller 43 may comprise, for example, a MC6802 microprocessor+6821 interface plus a TMS 2708JL ROM.

As can be seen above, the two signals at $f_1$ and $f_2$ are processed independently by the electronics described therein. Firstly, the low frequency signal at $f_1$ yields a high signal level compared to the higher frequency signal level at $f_2$ because the heater surface temperature variations are higher with the same average heater power for the lower frequency component. In general, the heater surface temperature variations will decrease with frequency as the heater does not take time to cool down between the heater cycles.

The large microphone signal at the low frequency $f_1$ allows measurements to be made at lower pressures while maintaining good vacuum (gas) conductance from the internal gauge volume 16 to the main vacuum volume 17. This permits a relatively high pump down speed to be achieved without the gauge 11 acting as a virtual leak. Further, as a consequence, rapid gauge response times are obtained, i.e. on the order of a fraction of a second.

The lower frequency amplitude signal $V_s$, at pressures below 1 torr, is an absolute gauge and in one embodiment reaches a peak at 10 to 30 torr, thereafter decreasing in amplitude. A phase shift relative to the low pressure measurement is found to occur at around 1 torr.

The higher frequency signal at $f_2$ is smaller than the lower frequency signal at low pressures but builds up at pressures of around 1 torr because the gas begins to act as a fluid and a thermoacoustic effect begins to occur. The acoustic filter keeps the thermoacoustic effect from being dissipated in the large chamber 17. The high frequency signal therefore supplies the pressure measurements in a relative manner from approximately 0.1 torr to 1 atmosphere, and above.

Referring now to FIGS. 4-6, there is shown one physical realization of the vacuum gauge 51 of the present invention. In this embodiment, a dielectric gauge body member 52, as of Teflon, is carried from a multipin electrical vacuum feedthrough assembly 53 comprising a vacuum flange 54 for joining the gauge to a port in the vacuum system 17. The feedthrough 53 includes an electrical insulator assembly 55 having a multiplicity of electrically conductive pins passing therethrough at 56 for making electrical connection to various elements carried by the feedthrough insulator structure 55.

The main body portion 52 includes a laterally directed slot therethrough at 57 to slideably receive the microphone structure 15. The microphone structure comprises a diaphragm 14 mounted over a capacitive plate 58 in insulative relation from the plate 58 which in-turn is mounted to a ceramic base plate 59. The leads to the microphone 61 are bent out in opposite directions and are electrically connected to a pair of the feedthrough leads 56. A flat 61 is formed on the insulative body 52 and the flat surface 61 is placed in gas communication with the diaphragm 14 via a vertically directed rectangular bore 63. A pair of line up pins 64 project upwardly from the surface 61 to be received within lineup holes 65 in the heater foil 12 at opposite ends thereof via the intermediary of the electrically conductive plates 66. The heater leads are connected between the screws 67 and a pair of feedthrough electrical pins 56.

Referring now to FIG. 5, the separator for separating the volume of the vacuum gauge 16 from the main volume 17 of the chamber under measurement is formed by a cylindrical cap 71 coaxially fitting over the main body 52 and being welded at its open end to the vacuum flange 54. The inner closed end of the cylindrical cap 71 is centrally bored and tapped to receive the acoustic filter 18 which comprises a block of material having a plurality of axially directed bores 72 passing therethrough.

Referring now to FIGS. 7 and 8 there is shown an alternative vacuum gauge embodiment 75 incorporating features of the present invention. In this embodiment, the body of the gauge 75 comprises a gnerally cup shaped metallic member 76, as of stainless steel, having an outwardly flared lip portion 77 serving as a vacuum flange for making a gas tight connection to the lip of a port in the vacuum system containing the gas, the pressure of which is to be measured. The outer end of the body portion 76 is closed off by means of a disc shaped ceramic header 78 brazed to the outer end of the body 76 and including a plurality of electrical feed through pins 79 passing through the insulator body 78 for making electrical connection for various elements within the body 76.

The body 76 includes an inwardly directed shoulder portion 81 to which is affixed a ceramic disc 82 having a pair of upstanding boss portions 83 for holding the heating foil 12 in spaced relation from the base of the ceramic member 82. The heater foil 12 is clamped at its ends to the ends of the boss members 83 via clamp members 84 which are clamped to the boss members 83 via a plurality of screws passing through the aligned bores in the foil 12 and terminating in tapped bores in the ceramic member 83.

The microphone 15 is centrally mounted to the ceramic disc 82 facing the heater foil 12 and a plurality of acoustic filter holes 85 pass through the ceramic disc 82 for providing gas communication between the chamber 17 and the gauge chamber portion 16 and to the backside of the microphone diaphragm 14. An optical acoustic filter, comprising a second metallic disc 87 having a plurality of acoustic filter bores 88 passing therethrough, is disposed between the shoulder 81 and the main vacuum chamber 17 containing the gas under measurement.

A more detailed description of the theory of the gauge 11 of the present invention is as follows:

The pressure range measurable using a single microphone and heater, with automatic gain changing electronics, extends from $10^{-4}$ torr to the condensation pressure of the measured gas. This extremely large pressure range devolves into two ranges wherein the operation of the gauge 11 differs in a fundamental way. In the low pressure range from $10^{-4}$ torr to (1-10) torr, the gauge 11 is an absolute gauge yielding pressure measurements which are independent of molecular gas species. In the range from (1-10) torr to the condensation pressure of the measured gas, the gauge is a relative gauge yielding pressure measurements which are somewhat dependent on the molecular gas species. The extent of this dependency will become clear as the principles of operation are explained. The crossover pressure range from absolute to relative range is determined primarily by the spacing d between the heater 12 and mcirophone 15.

Consider the low pressure absolute pressure range first. The heater 12 of FIG. 3 is made of a thin foil (e.g. 10,000 Å of titanium) which is directly heated by a time varying current passed through the foil. For simplicity let the current be sinusoidal. The foil thickness is chosen so that at the heater current frequency $\omega_o$, there is an appreciable variation in the foil surface temperature at frequency $\omega_o$ about the ambient. Such a frequency is in the neighborhood of 10-1000 Hz. It should be noted that as the heater current frequency $\omega_o$ is increased, the surface temperature amplitude at $\omega_o$ decreases, because the foil thermal time constant comes into play. At pressures for which the gas mean free path $\lambda$ is larger than the spacing d between the heater and microphone face 14, the gas molecules which impinge on the heater will carry momentum without collision for distance $\lambda$. Those molecules which impinge first onto the heater face 13 and then onto the microphone face 14 will carry a momentum which is characteristic of the heater surface temperature $T_s$ at the time the molecule impinges onto the heater foil. This momentum will be larger than the momentum carried by molecules impinging onto the other side of the microphone face. Thus the microphone will sense a net mementum at frequency $\omega_o$. An expression for the amplitude of the momentum transfer or net force on the microphone is derived below. The simple derivation below is based on the perfect gas law and the assumption of no molecule-molecule collisions. A treatment of this effect when molecular collisions are allowed is contained in Mason, E. A. and Block, Jour. Ann. Phys. (NY) 1, 7-16 (1966) "Molecular Inelastic Collision Cross Sections from the Radiometer Force".

Assume that the gas molecules are divided into six equal groups, moving in each of two directions along each of three perpendicular axes (x, y, z). Let the x direction be perpendicular to the plane of the microphone face 14. The Boltzmann relationship yields for the mean square velocity.

$$\tfrac{1}{2}mv^2 = 3/2kT_o \quad (1)$$

where m is the molecular mass and $T_o$ is the gas ambient absolute temperature After impinging on the heater the molecules satisfy $$\tfrac{1}{2}mv^2 = 3/2kT_1 \quad (2)$$

where $T_1$ is the heater temperature. The net momentum per second or net force along the x axis and thus acting on the microphone face of area $A_o$ is $$F = A_o[(n/2)V_x(mv_x^*) - (n/2)v_x(mv_x)] \quad (3)$$

where n is the number of molecules per unit volume.

The symbols ($v_x$, $v_x^*$) are written for the appropriate root mean square velocities. The factor $\tfrac{1}{2}$ occurs since only $\tfrac{1}{2}$ the molecules have a positive component for velocity along any axis.

The relation between ($v_x$, $v_x^*$) and (v, v*) is $$v_x = (1/\sqrt{3})v \quad v_x^* = (1/\sqrt{3})v^* \quad (4)$$

Using (1) and (2), the net force on the microphone is $$F = A_o n/2 k(\sqrt{T_1 T_o} - \sqrt{T_o^2}) \quad (5)$$

Using the gas pressure P (e.g. the perfect gas law)

$$P = (n/2)v_x(2mv_x) = nmv_x^2 = nKT \quad (6)$$

we obtain for the microphone force F
$$F = (A_o/2)P(\sqrt{T_1/T_o} - 1) \quad (7)$$

Equation (7) for F is time dependent. For $T_1 = T_o + \Delta T(t)$ where T $T_o$, F has a time varying component at the frequency $\omega_o$. It should be noted that F is independent of the molecular mass m or any reference to the particular molecular species of the gas.

In the high pressure regime at pressures such that $\lambda << d$, molecular collisions become important and the behavior of the gas becomes that of a hydrodynamic fluid. The analysis in this pressure region is complex and two elements have to be added to the device to make it a pressure gauge. These elements are an enclosure 16 surrounding the heater-microphone volume and a low-pass acoustic filter 18 leading to the gas volume 17 whose pressure is to be measured. A heurisitc explanation of the gauge's behavior will be given below in the pressure region where the gas behaves as a fluid, this is $\lambda << d$.

A heated film of gas called the thermal wave is formed on the heater surface. This film has a thickness with a scale factor dependent on the thermal properties of the gas and a frequency dependence of $\omega_o^{-\tfrac{1}{2}}$. Incidentally, a sound wave is formed at the same time, but at low frequencies, it yields a small effect and can be ignored. The thermal waves acts as a "piston" pressing on the gas in the enclosure at a frequency $\omega_o$ and causing a pressure change which is measured by the microphone. The amplitude of this thermal "piston" motion depends on the square root of the pressure, among other factors such as heater surface temperature and frequency. The low-pass acoustic filter 18 keeps the signal pressure change at frequency $\omega_o$ from escaping while allowing passage for gas pressure changes which occur at characteristic times whose frequencies are below the low-pass filter cut-off frequency.

The pressure transition region corresponding to $\lambda = d$ can be made to yield a smooth positive monotonic output signal as a function of pressure by choosing the proper heater-microphone geometric factors and enclosure volume 16.

Thus the composite gauge 11 comprises an absolute linear pressure gauge for pressures below 1–10 torr (depending on the spacing d) and a relative gauge whose response is proportional to the square root of pressure at pressures above 1–10 torr. The upper limit of pressures measured by this method is the condensation point of the measured gas, since no gross mechanical stress is introduced anywhere in the sensor. The microphone only senses an AC signal and never carries the DC pressure, since a leak is built into the microphone specifically to do away with signals at low frequencies.

It should be appreciated that if the range of gas pressure to be measured is limited to either the low pressure region or the high pressure region the geometric configuration can be changed from that decribed above. More particularly, if operation is limited to the low pressure regime the separator 71 and low pass acoustic filter 18 can be eliminated allowing the gauge heater and microphone to extend directly into the main vacuum chamber 17. Also the electronics can be simplified by eliminating the second channel at $f_2$ and the system controller 43 and read only memory 44 as the output of the A to D converter 41 can be indicated directly as pressure.

On the other hand, if measurements are to be made only in the high pressure regime, the microphone need not face directly into the heater surface 13 and only one signal channel is required without the need of the system controller 43 and read only memory 44.

What is claimed is:

1. In a thermal gas pressure gauge:
   heater means having a heater surface for disposition in gas communication with a gaseous medium, the gas pressure of which is to be sensed;
   temperature cycling means for cycling the temperature of said heater surface of said heater means to cause the gaseous material coming in contact with said thermally cycled heater surface to be cyclically heated; and
   sensing means spaced from said heater surface via the intermediary of a region of space for containing said gaseous medium and being responsive to the amplitude of the resultant cyclical heating effect of said gaseous material to derive an output determinative of the pressure of said gaseous medium.

2. The apparatus of claim 1 wherein said means for sensing the cyclical heating effect of said gaseous medium comprises, microphone means facing said cyclically heated surface, said microphone means being formed and arranged to be responsive to the cyclical changes in momentum of the cyclically heated gaseous medium to derive said output determinative of the pressure of the gaseous medium.

3. The apparatus of claim 1 wherein said heater means has a major and a minor face and wherein said heater surface comprises said major face of said heater means.

4. The apparatus of claim 2 wherein said microphone means includes a generally planar sensing diaphragm portion disposed facing said heater surface of said heater means so as to be responsive primarily to cyclical forces having vectors in a direction normal to the generally planar surface portion of said diaphragm.

5. The apparatus of claim 1 wherein said heater means includes a metallic foil having a major face serving as said heater surface; and
   means for running a time varying electrical current through said foil for directly heating same in a cyclical manner.

6. The apparatus of claim 4 wherein said heater surface of said heater means includes a major face portion facing said diaphragm of said microphone, and wherein the normal to the major face of said heater surface which faces said diaphragm is generally colinear to the normal to said planar surface portion of said diaphragm facing said heater surface.

7. The apparatus of claim 1 wherein said sensing means includes synchronous detector means also responsive to a cyclical reference signal of a frequency related to the frequency of the resultant cyclical heating effect for synchronously detecting said resultant cyclical heating effect to derive said output.

8. The apparatus of claim 1 including separation means for separating the region of space containing said gaseous medium to be measured into first and second regions, said sensing means and heater surface of said heater means being disposed in said first region of space which is coupled in gas communication with said second region of space via a gas passageway means through said separator means, and said gas passageway means including acoustic filter means having a low pass acoustic filter characteristic with the high frequency cut off of said low pass filter being of a frequency related to the cyclical frequency of said temperature cycling means so as to permit a cyclical pressure component to be developed within said first region of space in response to the cyclical heating of the gaseous medium therein, and wherein said sensing means is responsive to the amplitude of said cyclical pressure component within said first region to derive said output determinative of the gas pressure of the gaseous medium.

9. The apparatus of claim 1 including, indicator means responsive to said output to yield an indication to the user of the gas pressure of the gaseous medium.

10. The apparatus of claim 2 including, indicator means responsive to said output to yield an indication to the user of the gas pressure of the gaseous medium.

11. The apparatus of claim 8 including, indicator means responsive to said output to yield an indication to the user of the gas pressure of the gaseous medium.

12. The apparatus of claim 1 wherein said temperature cycling means includes means for cycling the temperature of said heater surface at first and second frequencies to cause the gaseous material coming in contact with said thermally cycled heater surface to be cyclically heated at said first and second frequencies;
   said sensing means being responsive to the amplitude of the resultant cyclical heating effect of said gaseous material at said first and second frequencies to derive a pair of outputs and said sensing means further including means for correlating said pair of output to derive an output determinative of the pressure of said gaseous medium.

13. The apparatus of claim 12 wherein said correlating means correlates said pair of outputs with tabled pairs of outputs to derive said output determinative of the pressure of said gaseous medium.

14. In a thermal gas pressure gauging method, the steps of:
cycling the temperature of a surface disposed in gas communication with a gaseous medium, the gas pressure of which is to be sensed, to cause the gaseous material coming in contact with said thermally cycled surface to be cyclically heated; and
sensing the cyclical changes in momentum of the cyclically heated gaseous medium to derive an output determinative of the pressure of the gaseous medium.

15. In a thermal gas pressure gauging method, the steps of:
cycling the temperature of a surface disposed in gas communication with a gaseous medium, the gas pressure of which is to be sensed, to cause the gaseous material coming in contact with said thermally cycled surface to be cyclically heated; and
sensing the cyclical changes in gas pressure of the cyclically heated gaseous medium to derive an output determinative of the pressure of the gaseous medium.

16. In a thermal gas pressure gauging method, the steps of:
cycling the temperature of a surface disposed in gas communication with a gaseous medium, the gas pressure of which is to be sensed, to cause the gaseous material coming in contact with said thermally cycled surface to be cyclically heated;
sensing the cyclical changes in momentum of the cyclically heated gaseous medium to derive a first output;
sensing the cyclical changes in pressure of the cyclically heated gaseous medium to derive a second output; and
correlating said first and second outputs to derive a third output determinative of the pressure of the gaseous medium.

* * * * *